United States Patent [19]

Cuscurida et al.

[11] Patent Number: 4,767,836

[45] Date of Patent: Aug. 30, 1988

[54] STORAGE STABLE POLYURETHANE COATING

[75] Inventor: Michael Cuscurida, Austin, Tex.
[73] Assignee: Texaco, Inc., White Plains, N.Y.
[21] Appl. No.: 50,444
[22] Filed: May 18, 1987
[51] Int. Cl.$^4$ .................. C08G 18/80; C08G 18/32; C08G 18/08
[52] U.S. Cl. ....................... 528/45; 528/61; 528/76
[58] Field of Search ................ 528/45, 76, 61

[56] References Cited

U.S. PATENT DOCUMENTS

| | | | |
|---|---|---|---|
| 4,465,858 | 8/1984 | Cuscurida et al. | 564/477 |
| 4,490,520 | 12/1984 | Ogasa et al. | 528/315 |
| 4,491,663 | 1/1985 | Kordomenos et al. | 544/193 |
| 4,495,229 | 1/1985 | Wolf et al. | 427/388.2 |
| 4,590,009 | 5/1986 | Pampouchidis et al. | 560/332 |
| 4,590,254 | 5/1986 | Chang et al. | 528/49 |
| 4,624,996 | 11/1986 | Rizk et al. | 525/453 |

FOREIGN PATENT DOCUMENTS

| | | | |
|---|---|---|---|
| 003212 | 7/1980 | Fed. Rep. of Germany | 528/45 |
| 058270 | 10/1983 | Japan | 528/45 |
| 2151643A | 7/1985 | United Kingdom . | |

OTHER PUBLICATIONS

"Blocked Isocyanates in Coatings", Potter et al., Mobay Corp., 1985.
Technical Services Bulletin, "Jeffamine ® T-403 Polyoxypropylenetriamine", 1984.
Technical Services Bulletin, "Jeffamine ® D-230 Polyoxypropylenediamine", 1984.
Technical Services Bulletin, "Jeffamine ® D-400 Polyoxypropylenediamine", 1987.

Primary Examiner—Harold D. Anderson
Assistant Examiner—Dennis R. Daley
Attorney, Agent, or Firm—Jack H. Park; Kenneth R. Priem

[57] ABSTRACT

A storage stable polyurethane coating composition which may be heat cured under relatively mild conditions comprising an isocyanate which has been chemically blocked and a curing agent comprising a partially alkoxylated polyoxyalkylene amine is described.

3 Claims, No Drawings

STORAGE STABLE POLYURETHANE COATING

BACKGROUND OF THE INVENTION

1. Field of the Invention

This invention relates to the use of specific compounds for curing blocked polyisocyanates in a coating composition.

2. Related Art in the Field

Blocked polyisocyanates are used to make one component coating systems which should be storage stable at room temperature. A mixture of a polyisocyanate and an active hydrogen containing compound is only stable in storage at room temperature and is only workable to form a coating if the reactive isocyanate groups are blocked and are, therefore, unable to react. When heat is applied, the blocking agents must of course split off and the isocyanate react with the active hydrogen containing material to form the cured polyurethane coating.

The blocking of polyisocyanates is a procedure which is well known for the temporary retardation of the reaction between the isocyanate groups and an active hydrogen containing compound. The literature notes various blocking agents; for example, tertiary alcohols, phenols, acetoacetic ester, ethyl malonate, and others. Various methods of blocking and unblocking isocyanates are revealed in the prior art, including the following patents and publications.

U.S. Pat. Nos. 4,495,229; 4,624,996; 4,590,009; 4,491,663; and U.K. Patent Application GB No. 2 151 643A. A paper concerning the subject is entitled "Blocked Isocyanates in Coatings," by T. A. Potter, et al (1985). Many of these publications and patents describe the use of amines as well as hydroxyl containing materials to block isocyanates and also describe these same materials as curing agents.

If a highly reactive material such as primary amine is used as the curing agent to unblock the isocyanate, the stability of the mixture of blocked isocyanate and curing agent is decreased because of the high reactivity of the amine toward the isocyanate even though this isocyanate is blocked. Therefore, premature gelling indicating reaction is a problem and storage becomes difficult and very sensitive to temperature. However, if a polyol is used as the curing agent, then the material will require an exceptionally high temperature for curing and perhaps a lengthy curing time as well. It is believed that the invention herein solves these problems.

SUMMARY OF THE INVENTION

A storage stable polyurethane coating composition which may be heat cured under relatively mild conditions comprising an isocyanate which has been chemically blocked and a curing agent comprising a partially alkoxylated polyoxyalkylene amine is described.

DETAILED DESCRIPTION OF THE PREFERRED EMBODIMENTS

According to the present invention, a polyurethane one component heat curable coating is made of a mixture of blocked isocyanate and a curing agent which is partially alkoxylated polyoxyalkylene amine, which mixture is stable in storage and which hardens at a relatively mild temperature of about 100° C.

It has now been discovered that it is possible to produce in a simple manner stable one-component blocked polyisocyanate systems that may be deblocked at relatively low temperatures if a material is used for the curing or deblocking which is a partially alkoxylated polyoxyalkylene amine. These materials contain secondary amine moieties and hydroxyl groups. Since the alkoxylation of the polyoxyalkylene amine reduces the reactivity of the amine, the storage stability is enhanced. However, since it is the secondary amine which will probably react to unblock and cure the blocked isocyanate, it will do so without the addition of catalyst and at a much lower temperature than if the curing agent were a mere polyol. The material useful for the curing agent of my invention may be described as a partially alkoxylated polyoxyalkylene amine.

Useful materials include polyoxyalkyleneamines ranging in molecular weight from about 200 to 5000 with a functionality of from about 2 to 3 which have been alkoxylated from about 25–75 percent. An example of a preferred embodiment is a compound of the general formula:

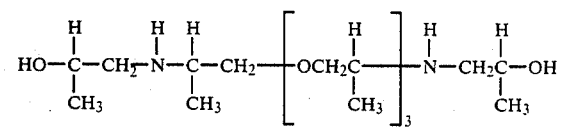

which is sold as JEFFAMINE ® C-346 by Texaco Chemical Company. The method for making the above compound is found in U.S. Pat. No. 4,465,858 where I am a co-inventor. This patent is incorporated by reference.

Other embodiments include polyoxyalkylene amines (before alkoxylation) having the following formulas:

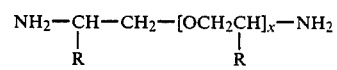

where x is from about 2 to 35, and

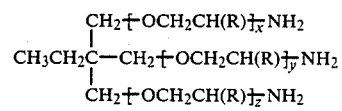

where each R can independently be hydrogen or a lower alkyl group of 1 to 4 carbon atoms, x can range from 1 to 50 and the sum of x, y and z can range from 5.3 to 84. As stated above, the alkylene moiety is preferably ethylene, propylene and 1,2-butylene. Thus R is more preferably hydrogen or an alkyl group of 1 or 2 carbon atoms. Descriptions of these materials are found in U.S. Pat. No. 4,465,858.

Permissible alkylene oxide reactants include alkylene oxide having from 2 to 8 carbon atoms, preferably ethylene oxide, propylene oxide, 1,2-butylene oxide, styrene oxide and mixtures thereof. Especially preferred are propylene oxide alone or together with ethylene oxide.

The following are suitable as initial compounds which may be blocked with the secondary amines according to the present invention: polyisocyanates, especially diisocyanates such as aliphatic, cycloaliphatic, araliphatic, aryl-substituted aliphatic and/or aromatic diisocyanates, as they are described, for example, in Houben-Weyl, "Methods of Organic Chemistry," Volume XIV/2, pages 61-70, and in the article by W. Siefken in "Justus Liebigs Annalen der Chemie" 562, pages 75-136, including such compounds as 1,2-ethylene diisocyanate, 1,4-tetramethylene diisocyanate, 1,6-hexamethylene diisocyanate, 2,2,4- or 2,4,4-trimethyl-1,6-hexamethylene diisocyanate (TMDI), 1,12-dodecane diisocyanate, ω,ω'-diisocyanate dipropylether, cyclobutane-1,3-diisocyanate, cyclohexane-1,3- and 1,4-diisocyanate, 3-isocyanato methyl-3,5,5-trimethylcyclohexyl isocyanate, which is also called isophorone diisocyanate and is also abbreviated as IPDI, decahydro-8-methyl-(1,4-methanonaphthalene-2 (or 3) 5-ylene dimethylene diisocyanate, decahydro-4,7-methanoinda-1 (or 2) 5 (or 6)-ylene dimethylene diisocyanate, hexahydro-4,7-methane indan-1-(or 2) 5 (or 6)ylene diisocyanate, 2,4- and 2,6-hexahydrotoluene diisocyanate, perhydro-2,4- and 2,6-hexahydrotoluene diisocyanate, perhydro-2,4- and/or 4,4'-diphenyl methane diisocyanate, ω,ω'-diisocyanate-1,4-diethylbenzene, 1,4-phenylene diisocyanate, 4,4'-diisocyanate diphenyl, 4,4'-diisocyanate-3,3'-dichlordiphenyl, 4,4'-diisocyanate-3,3'-dimethoxy diphenyl, 4,4'-diisocyanate-3,3'-dimethyldiphenyl, 4,4'-diisocyanate-3,3'-diphenyl-diphenyl, 4,4'-diisocyanate diphenyl methane, naphthylene-1,5-diisocyanate, toluene diisocyanate, toluene-2,4- or 2,6-diisocyanate, N,N'-(4,4'-dimethyl-3,3'-diisocyanate diphenyl)-uretidione, m-xylylene diisocyanate, but also the triisocyanates such as 2,4,4-triisocyanate, diphenyl ether, 4,4',4''-triisocyanate triphenyl methane, tris(4-isocyanate phenyl)-thiophosphate. Additional suitable isocyanates are described in the above mentioned article in the "Annalen" on page 122 ff.

Particularly preferred are the commercially accessible aliphatic, cycloaliphatic and aromatic diisocyanates and especially 3-isocyanatomethyl-3,5,5-trimethyl cyclohexyl isocyanate and toluene diisocyanate and their isomer mixtures.

Useful isocyanates include prepolymers containing active isocyanate groups based on isocyanates set out above and active hydrogen containing materials such as polyols.

The block agents useful in my invention are those which are known to practitioners of the art and include: phenol, cresols and long aliphatic chain substituted phenols such as isononylphenol. Also included are amides such as Σ-caprolactam, oximes such as butanoneoxime, active methane group-containing compounds such as malonates and acetoacetates. Sodium bisulfite is also a known blocking agent as is hydrocyanic acid.

Curing temperatures used for products of my invention range from about 100° to 200° C.

The usefulness of my invention will be illustrated by the following examples.

EXAMPLE 1

This example will illustrate the preparation of a blocked isocyanate prepolymer.

Into a 2-liter four-necked flask equipped with a stirrer, thermometer, water condenser, dropping funnel and nitrogen source were charged 800 g of MONDUR ® CB-601 PMA (an isocyanate prepolymer supplied by Mobay Chemical Co. which contained 2.4% free isocyanate). Methyl ethyl ketone oxime (108.7 g) was then added dropwise over a one-hour period. The reaction temperature peaked at 68° C. during that period. After an additional 1.25 hour stirring the material was diluted with 108.7 g ethylene glycol monoethyl ether acetate. The infrared spectra of the product showed that essentially all of the free isocyanate had reacted.

EXAMPLE 2

This example will show the use of nonylphenol as a blocking agent for isocyanate prepolymers.

Into a 2-liter four-necked flask equipped with a stirrer, thermometer, water condenser, dropping funnel and nitrogen source were charged 600 g of MONDUR ® CB-601 PMA and 2.7 g THANCAT ® TD-33. Nonylphenol (337 g) was then added slowly over a 1.4 hour period. The reaction temperature peaked at 48° C. during the nonylphenol addition at which point heat was applied and the mixture heated at 100°–110° C. for 2 hours. The reaction mixture was then diluted with 224.3 g ethylene glycol monoethyl ether acetate. The infrared spectra of the blocked isocyanate showed the absence of free isocyanate.

EXAMPLE 3

This example will illustrate the use of the two mole propylene oxide adduct* of a 400 m.w. polyoxypropylenediamine (JEFFAMINE ® D-400; Texaco Chemical Co.) to prepare heat cured coatings from the blocked isocyanate of Example 1.
*Prepared as described in U.S. Pat. No. 4,465,858.

50 g of the blocked isocyanate of Example 1 was mixed with 40.5 g of the two mole propylene oxide adduct of JEFFAMINE D-400, and 0.9 g beetle resin. A 2.5 mil film of the coating was spread with a doctor blade and the film was allowed to stand in a hood for one hour. The film was then placed in a 60° C. oven which was rapidly heated to 110° C. The film was then cured at 110°–120° C. for one hour. Properties of the cured film were as follows:

| Properties | Sample No. 94B |
|---|---|
| Pencil hardness | 3B |
| Impact resistance, in/lb | |
| Forward | Pass 160 |
| Reverse | Pass 160 |

EXAMPLE 4

This example will illustrate the use of the two mole propylene oxide adduct of JEFFAMINE D-400 and a 230 m.w. polyoxypropylene diamine (JEFFAMINE D-230) to prepare heat cured coatings from the blocked isocyanate of Example 2. The latter product is marketed by Texaco Chemical Co. as JEFFAMINE C-346. This example will also show how the hardness and flexibility of the films can be modified by varying the nature of the partially propoxylated polyoxyalkylene amine.

Formulation, details of preparation and film properties are shown in the following table:

| | Coating No. | |
|---|---|---|
| | 97A | 97B |
| Formulation, pbw | | |
| Blocked isocyanate of Example 2, g | 100 | 100 |
| JEFFAMINE C-346, g | 46.7 | — |
| JEFFAMINE D-400.2 PO, g | — | 73 |
| Cure temperature, °C. (hr) | 100–105 (0.5) | 100–105 (0.5) |
| Film thickness, mil | 2.5 | 2.5 |
| Properties | | |
| Pencil hardness | H | B |

| | Coating No. | |
|---|---|---|
| | 97A | 97B |
| Impact resistance, in/lb | | |
| Forward | Pass 20 | Pass 120 |
| Reverse | Pass 20 | Pass 120 |

EXAMPLE 5

This example will demonstrate the improved stability of the blocked isocyanate of Example 2 in the presence of the partially alkoxylated polyoxyalkylene amines of this invention as compared to a prior art 400 m.w. polyoxyalkylene amine (JEFFAMINE® D-400; Texaco Chemical Co.). The stabilities were compared by placing the compositions in an oven at 50° C. for three days. Results are as follows:

| | Sample No. | | |
|---|---|---|---|
| Composition, pbw | 5A | 5B | 5C |
| Blocked isocyanate of Example 2, g | 100 | 100 | 100 |
| JEFFAMINE C-346, g | 40.8 | — | — |
| JEFFAMINE D-400.2 PO, g | — | 63.7 | — |
| JEFFAMINE D-400, g | — | — | 32.1 |
| Stability (3 days at 50° C.) | Fluid after 3 days | | Gelled within 4 hours |

| GLOSSARY | |
|---|---|
| MONDUR® CB-601 PMA | a toluene diisocyanate adduct dissolved in propylene glycol monomethyl ether acetate (10–11% isocyanate). |
| THANCAT® TD-33 | 33% triethylene diamine in propylene glycol. |

| GLOSSARY | |
|---|---|
| JEFFAMINE® D-400 | 400 molecular weight polyoxypropylene diamine. |
| JEFFAMINE® D-230 | 230 molecular weight polyoxypropylene diamine. |
| JEFFAMINE® C-346 | two mole propylene oxide adduct of JEFFAMINE® D-230. |

I claim:

1. A storage stable, heat curable polyurethane coating comprising a blocked isocyanate and a curing agent comprising a partially alkoxylated polyoxyalkylene amine of the general formula:

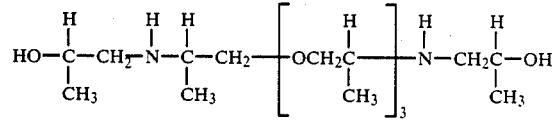

2. A heat curable polyurethane coating as in claim 1 wherein the curing agent comprises a partially alkoxylated polyoxyalkylene amine of about 200 to 5000 molecular weight with a functionality of about 2 to 3 which has been alkoxylated from about 25 to 75 percent.

3. A storage stable, heat curable polyurethane coating comprising a blocked isocyanate and a curing agent comprising a partially alkoxylated polyoxyalkylene amine wherein the isocyanate is a prepolymer and the partially alkoxylated polyoxyalkylene amine is of the general formula:

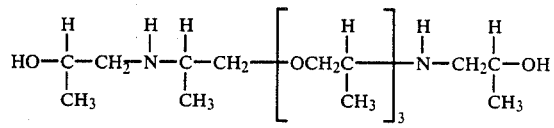

* * * * *